United States Patent [19]

Eveley

[11] Patent Number: 5,362,095
[45] Date of Patent: Nov. 8, 1994

[54] RESILIENTLY MOUNTED CANTILEVER SPRING SUPPORTED AIR SPRING SUSPENSION

[76] Inventor: Nicholas Eveley, 2814 Barton Street, East Hamilton Ont., Canada, L8E 2J9

[21] Appl. No.: 925,467

[22] Filed: Jul. 27, 1992

Related U.S. Application Data

[63] Continuation-in-part of Ser. No. 735,878, Jul. 25, 1991, abandoned.

[51] Int. Cl.$^5$ .............................................. B60G 11/46
[52] U.S. Cl. ................................... 280/712; 267/269; 267/52
[58] Field of Search ............... 280/713, 712, 711, 688, 280/717, 718, 825; 267/269, 270, 25, 28, 31, 32, 248, 256

[56] References Cited

U.S. PATENT DOCUMENTS

| | | | |
|---|---|---|---|
| 1,862,027 | 6/1932 | Lord | 267/269 |
| 1,916,077 | 6/1933 | Schlatter | 267/270 |
| 1,983,796 | 12/1934 | Geyer | 267/269 |
| 2,324,997 | 7/1943 | Brown | 267/269 |
| 3,510,149 | 5/1970 | Raidel | 280/712 |
| 3,671,030 | 6/1972 | Marion | 267/270 |
| 3,674,249 | 7/1972 | McGee | 267/52 |
| 3,792,871 | 2/1974 | Chalmers | 267/292 |
| 3,802,718 | 4/1974 | Schaeff | 280/712 |
| 3,912,965 | 11/1975 | Skerry | 267/269 |
| 4,162,090 | 7/1979 | Schwartz | 280/688 |
| 4,858,959 | 8/1989 | Wallace | 280/713 |

FOREIGN PATENT DOCUMENTS

| | | | |
|---|---|---|---|
| 76408 | 4/1985 | Japan | 280/673 |
| 88618 | 5/1985 | Japan | 280/711 |

*Primary Examiner*—Karin L. Tyson
*Attorney, Agent, or Firm*—McConnell and Fox

[57] ABSTRACT

A vehicle suspension of simple design which provides selectable axle heights with reference to the vehicle chassis with minimal component change. The simple but rugged design provides maximum transverse stability by spring form and bushing design and by reducing shock absorber stroke length extends shock absorber life.

8 Claims, 4 Drawing Sheets

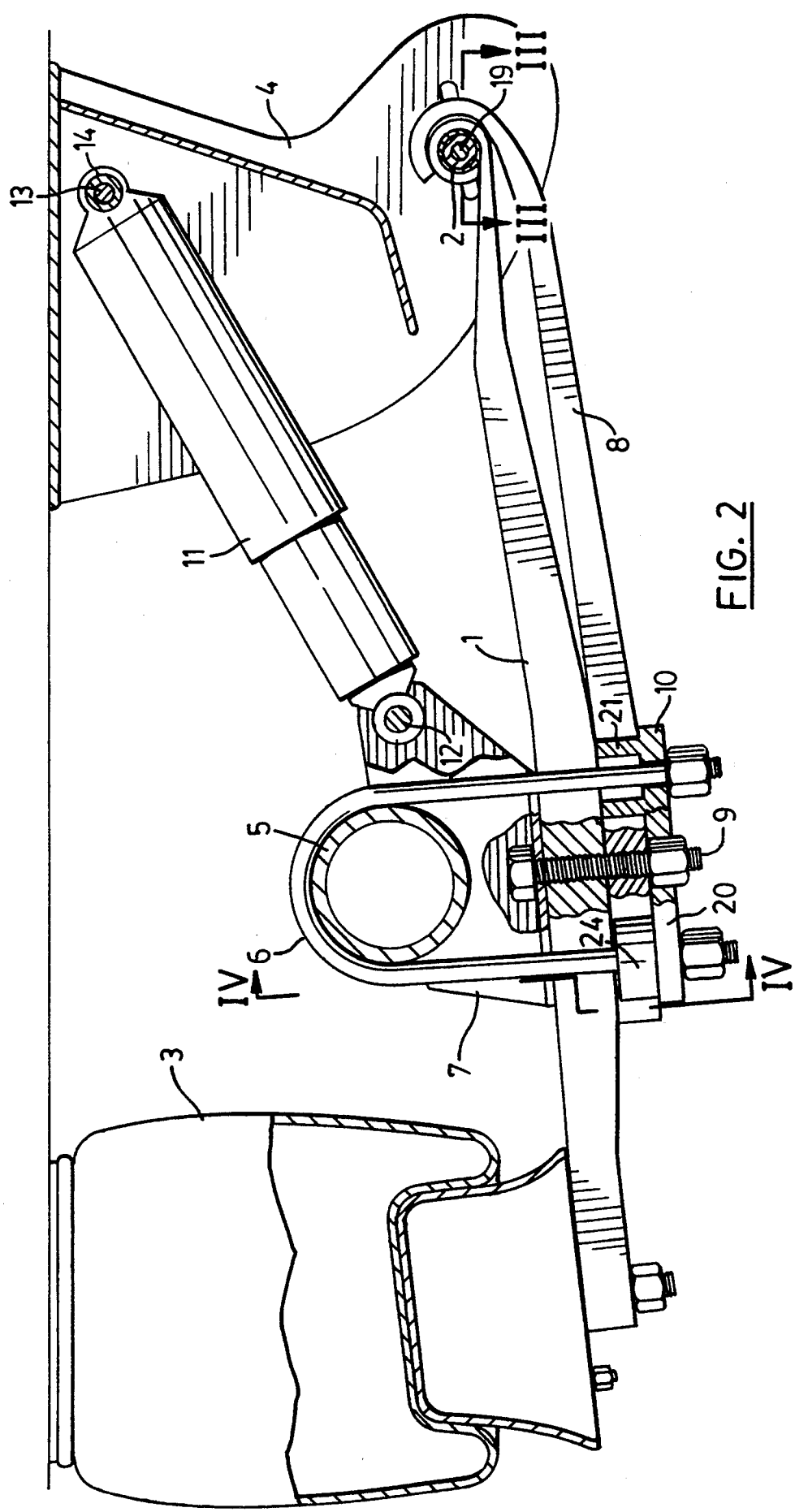

RESILIENTLY MOUNTED CANTILEVER SPRING SUPPORTED AIR SPRING SUSPENSION

This application is a continuation-in part of application Ser. No. 07/735,878 filed Jul. 25, 1991, now abandoned.

FIELD OF THE INVENTION

This invention relates to suspensions for road vehicles and in particular air suspensions

DESCRIPTION OF THE PRIOR ART

Suspensions for road vehicles, particularly heavy freight carrying vehicles, include both spring and air suspension. An air suspension is one incorporating an air bag as one part of the suspension. Requirements of the suspension differ depending upon its specific application, for example, drive axle suspension such as are used in tractors do not require much vertical freedom, indeed, their motion must be restricted. In view of the drive coupling, they are required to be quite stiff so that in the transverse direction various motion restricting apparatus is generally included. Trailer suspension, on the other hand, must be capable of substantial deflection in a vertical direction to accept varying loads and operate both in the loaded and unloaded condition in a safe manner. While providing substantial vertical deflection, the suspension should prohibit substantial transverse deflection which would yield instability in the trailer. In addition, the suspension must be safe and reliable giving maximum life with minimum maintenance. Numerous prior attempts have been made to provide the foregoing using pivoted beams supported on one end by an air bag, typical of such suspensions are U.S. Pat. Nos. 4,033,608, 4,397,478, 4,946,190. All of such prior solutions, however, were unduly complex requiring contoured beams or springs and provided insufficient transverse stability.

It is usual in this field that the suspension be manufactured by one manufacturer while the trailer itself is manufactured by an original equipment manufacturer who purchases the suspension from the suspension manufacturer. Since trailers may vary widely in their weight carrying capacity, and other structural characteristics, bed width, length and depth a suspension must be suitable for many applications. It would be desirable to provide a suspension that was applicable to any installation with minimal difference in the structure and maximum flexibility.

Suspensions normality include shock absorbers and, particularly in trailer suspensions, the shock absorber is required to perform very actively in the unloaded condition. Because of the large vertical travel, the operation of the shock absorber is extremely arduous and tends to destroy shock absorbers in a short time.

Finally, the spring material used in modern suspensions is extremely hard but may be easily damaged. It is, therefore, desirable to provide a spring arrangement that minimizes the risk of spring damage and provides for adequate safety in the event of spring failure. It should be recognized that in the trailing axle design with a pivoted spring, the sole retention of the axle is effectively the pivot point of the spring. Failure at this point results in the axle moving backwards causing severe damage to the whole trailer and great hazard. Retainers have been provided in the past to restrain the axle in the event of spring failure and it is desirable that such retainers be simple and reliable.

SUMMARY OF THE INVENTION

In accordance with the present invention, a suspension is provided which overcomes the limitations of prior suspensions, is simple and reliable in design, has a long life and, at the same time, is of such a design that it may be readily adapted to various application requiring different axle heights with reference to the trailer chassis and different clearance distances.

A clearer understanding of my invention may be had from the following description and drawings in which:

BRIEF DESCRIPTION OF THE DRAWINGS

FIG. 2 is a sectional elevation of the suspension of FIG. 1 at II—II.

DESCRIPTION OF THE PREFERRED EMBODIMENT

Figure 1:
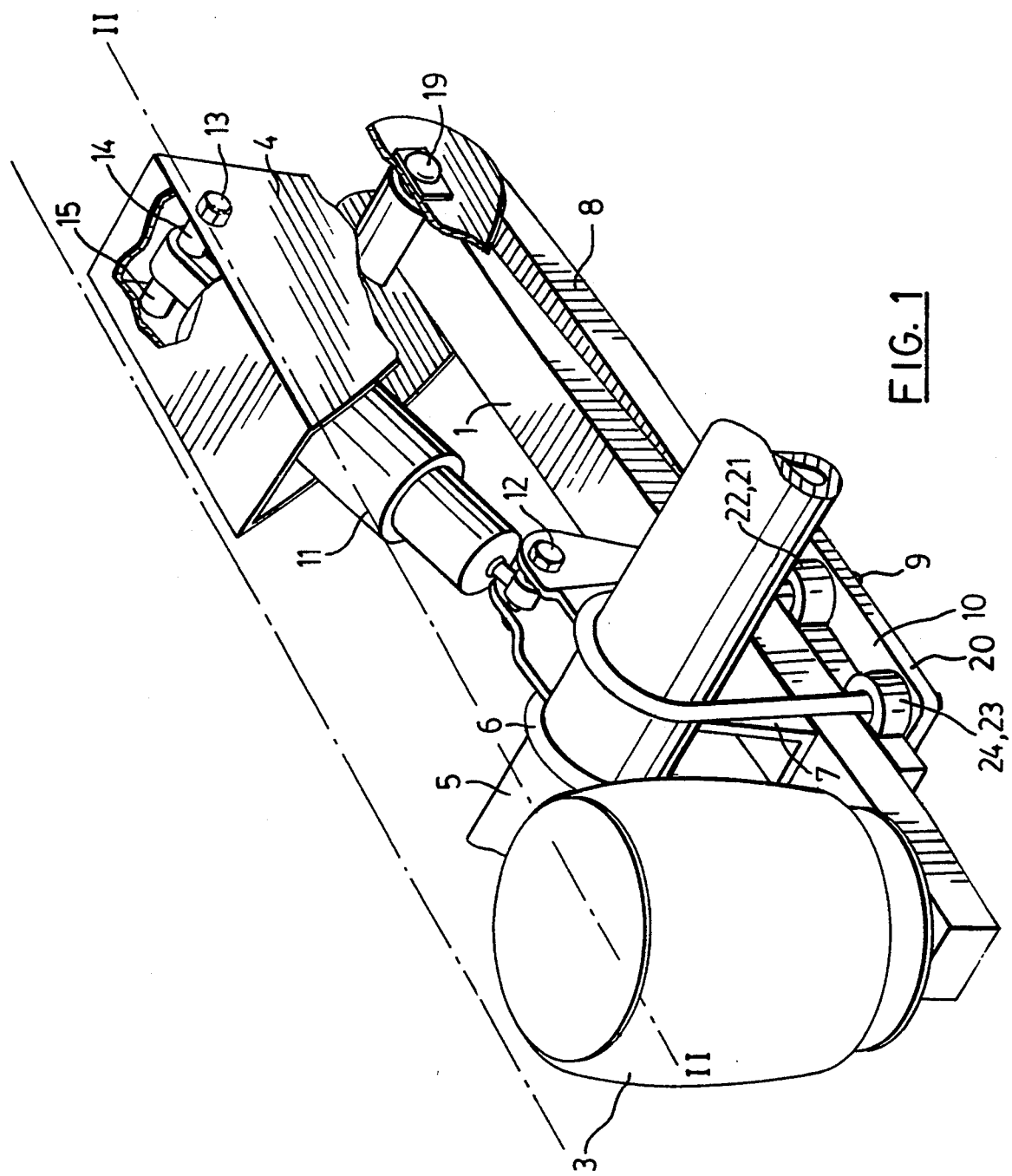
FIG. 1 is an isometric view of a suspension in accordance with my invention.

As may be seen in FIGS. 1-4, the suspension consists of a parabolic spring beam 1, pivoted on a bushing 2 and supported at its free end by an air bag 3. The pivot bushing 2 is mounted in a formed steel fabricated hanger bracket 4 by means of a "Huck" bolt stressed to a tension equivalent to Both the air bag 3 and the bracket 4 are mounted on a trailer chassis or frame (not shown). The axle 5 is welded to the axle seat 7. The axle and axle seat assembly sit on the parabolic spring beam 1 and are clamped down on the spring 1 by "U" bolts 6. The "U" bolts 6 pass through lower clamping plate 10 which fits around retainer spring 8, as more clearly shown in FIG. 4. Nuts 6a on "U" bolts 6 retain the springs 1 and 8 between the axle seat 7 and the lower clamping plate 10 and must be torqued on the "U" bolts 6 to about 900 ft. lbs. to ensure that these members are all securely positioned. A locating bolt 9 holds the springs 1 and 8 together at this location.

Retainer spring 8 is pivoted about the bushing 2 by virtue of its curved end which wraps around the eye of spring 1 at the bushing 2.

A shock absorber 11 is attached to the axle seat 7 by bolt 12 and to the bracket 4 by bolt 13 and locating spacers 14 and 15.

Figure 3:
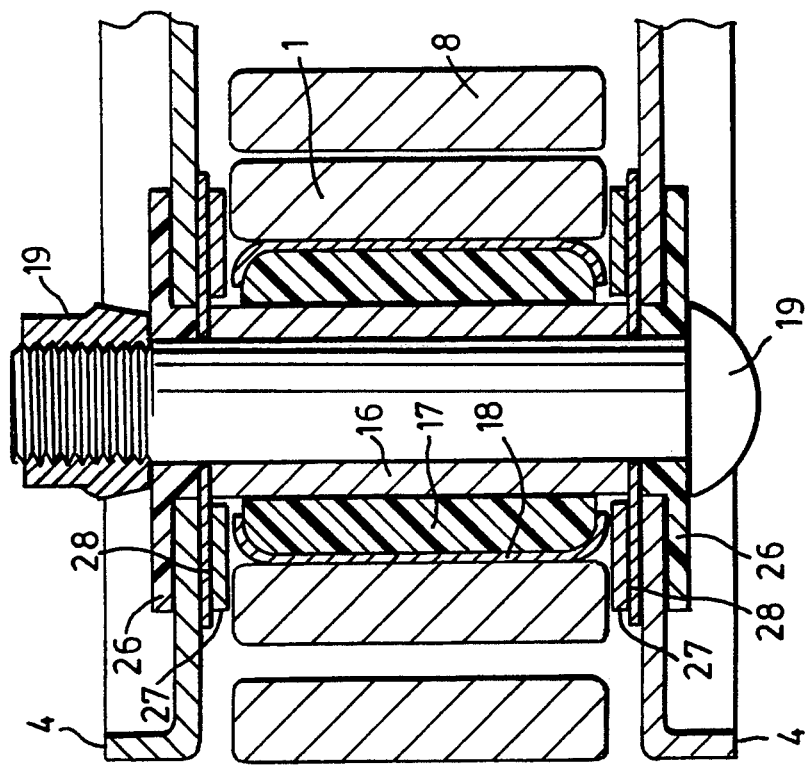
FIG. 3 is a sectional view of the pivot end of the suspension at section line III—III of FIG. 2.

The design of bushing 2 is illustrated in FIG. 3 which shows the heavy duty internal sleeve 16 to which is bonded a resilient polyurethane core 17. The selection of this material is critical to the proper operation of the bushing. It has been found that a polyurethane material sold under the tradename PERSISTA 82-A having a tensile strength of 5000 psi and elongation of 490% is suitable for the purpose. Surrounding the core 17 is a steel outer sleeve 18. The ends of this sleeve are rolled in retaining the polyurethane material in a compressed state and preventing any extrusion of the material when the bushing is subjected to compression loading or torsional loading.

It should be noted that the mounting of the outer sleeve 18 on the core 17 is highly critical. The two parts must be sized to provide a substantial interference fit thus preventing slippage between the parts. No actual bonding between the parts appears practical due to the characteristic shrinkage of the polyurethane during curing.

In operation the bushing is subjected to torsional forces as spring 1 pivots at the bushing and also to differential compressive forces as the axle attempts to move sideways due to centrifugal forces when travelling around curves. These forces acting on the bushing cause the polyurethane to heat up which causes it to expand increasing the force required to deflect the inner and outer sleeves of the bushing with respect to each other. This increased resistance to deflection is progressive and increases the stability of the suspension.

The mounting of the bushing in the eye of spring 1 is also critical since no slippage is permissible between these parts. The eye therefore is formed as a force fit over sleeve 18. The yield point of the steel of the spring is extremely high and therefore once the bushing is inserted, the forces between the sleeve and the eye remain high and it is very difficult to remove the bushing or cause any slippage between the eye and the bushing once they have been assembled.

The assembly of the bushing to the hanger bracket 4 is also critical. Substantial compressive forces are necessary to maintain the tight nonslipping mounting of the bushing. As previously noted the bolt 19 is assembled with substantial tension and the compressive forces of the bolt are applied through alignment plates 26 and thrust washers 28 to the inner sleeve 16 which must be designed with sufficient strength to accept these forces. These forces are also applied through wear washers 27 to the outer sleeve 18 and help to retain the core 17 from extruding when under stress.

Figure 4:
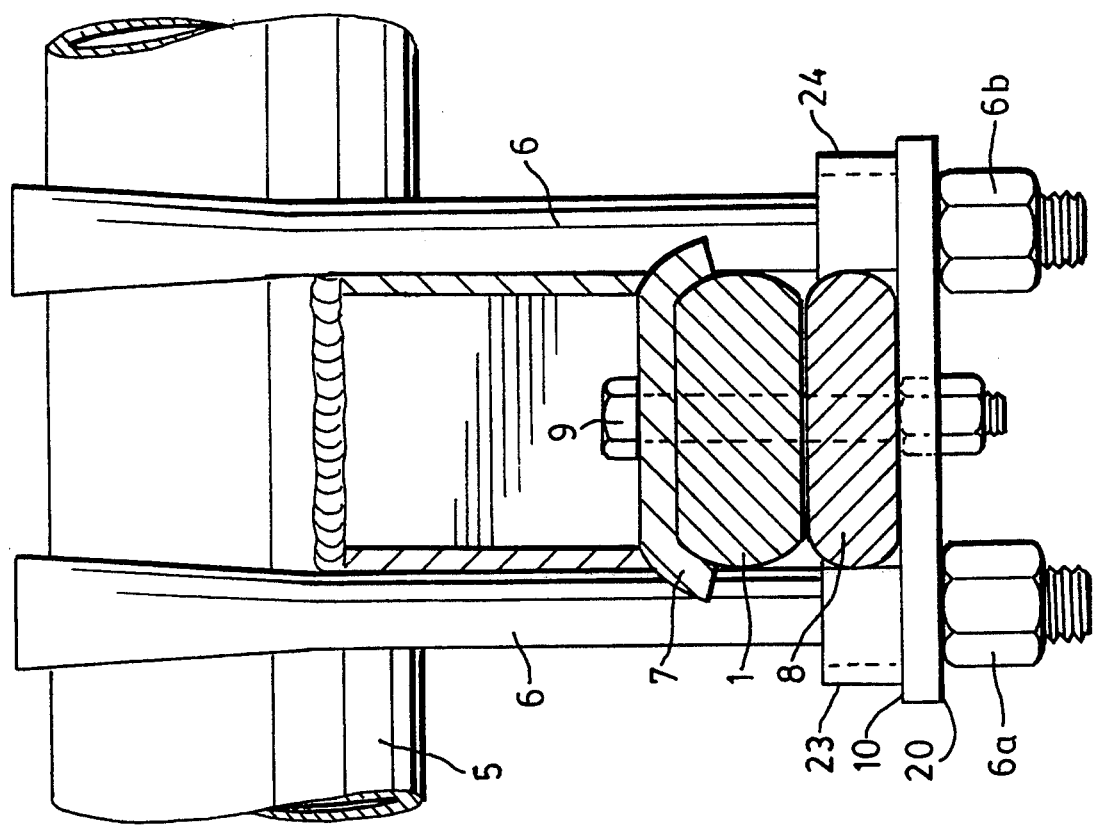
FIG. 4 is a sectional view of axle seat and spring at section line IV—IV of FIG. 2.

As will be seen in FIG. 4 the spring beam 1 and the retainer spring 8 are not rectangular in crossection but have rounded edges to avoid stress concentration. The lower surface of axle seat 7 is formed to conform exactly to the crossection of the spring 1 and the forward and rearward lower edges of the axle seat are radiused to eliminate any edge contact between the axle seat and the spring. The contour of the axle seat and the locating bolt 9 prevent any transverse or longitudinal motion of the spring relative to the axle seat. Notches in wrapped over edges of the axle seat provide accurate location for the "U" bolts 6.

The lower clamping plate 10 as shown in FIGS. 1 and 4 consists of a flat plate 20 and four "U" shaped members 21, 22, 23, and 24 which surround the holes through which the "U" bolts pass. These "U" shaped members are an exact fit on retainer spring 8. In assembling the "U" bolts 6 are passed over the axle 5, through the notches in the edges of the axle seat 7, which maintain the location of the seat and the "U" bolts, and down through the holes in the lower clamping plate 10. Nuts are then applied to the "U" bolts and torqued to about 900 ft. lbs. The resulting tension seats the axle seat firmly on the spring 1 and clamps the lower clamping plate 10 firmly on retainer spring 8. This connection must prevent any lateral movement of the axle relative to the springs and thus provide the desired stability of the whole suspension.

It must be emphasised that bushing 2 is not shown to scale. The dimensions necessary to provide rigidity and minimal transverse motion of the free end of spring 1 will vary depending upon the rating of the suspension. It has been found however, that a suspension rated at 25,000 lbs. requires a bushing of about 4" in length with an inner sleeve of about 0.375" thickness and a compressed polyurethane core of about 3.2" diameter. The outer sleeve will be proportionally dimensioned and rolled in, as shown, to more than half enclose the ends of the core.

It will be seen that the location of the axle relative to the trailer chassis is dependent upon the height of the axle seat and substantial variations in this mounting height can be provided by a selection of possible axle seat heights. The suspension is therefore quite flexible in its application. The equipment manufacturer can stock standard suspensions and a selection of axle seats to provide variable spacing of the axle from the spring and thus a selectable axle height or spacing from the trailer chassis.

Figure 5:
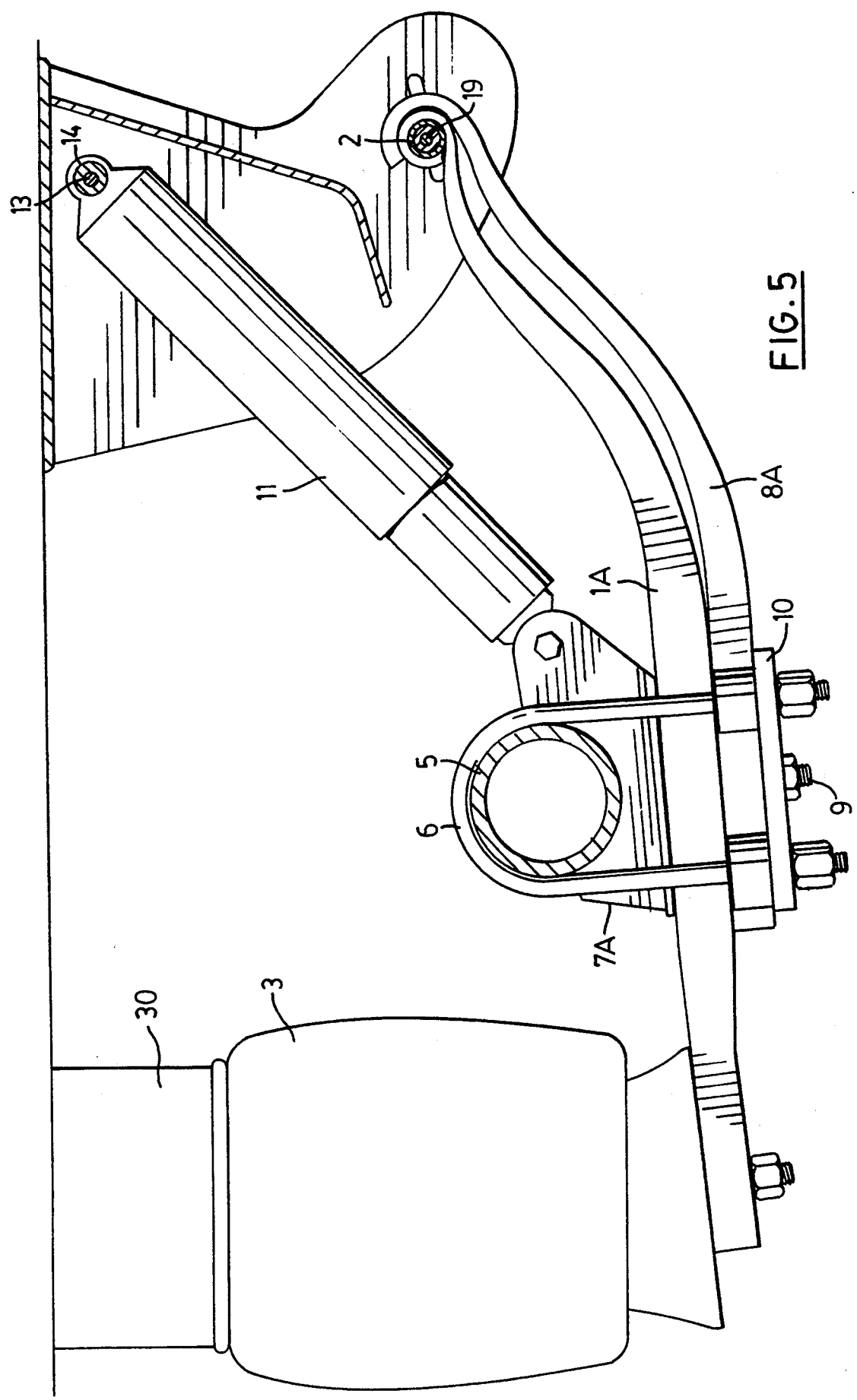
FIG. 5 is an elevational view of an alternative suspension in accordance with my invention.

As shown in FIG. 5, the axle seat 7A is lower than the axle seat of FIG. 2. A further degree of freedom of axle location is provided by supplying an alternative form of main spring 1A which is not straight but has a small curvature and similarly, the retainer spring 8A has a corresponding curve, other wise the suspension is as before. The curvature of the spring, however, requires a spacer 30 between the air bag 3 and the chassis to maintain the proper alignment of the spring 1A and the air bag.

It will be seen therefore that a suspension of extremely flexible application has been provided which requires only two variables to provide a wide range of axle locations. The axle seat and its associated U-bolts may vary over a sufficient range to provide variable height and, if necessary, retainer spring and main spring may be contoured to provide a second range of axle height as shown in FIG. 5.

For safety and durability, it is essential that the dimensions, particularly of spring 1, be adequate. The rigidity of this spring contributes to the stability of the assembly. While obviously the dimensions will depend upon the rating, typical dimensions for a 25,000 lb. Suspension would be a spring thickness of 1.75 inches and a width of 4 inches, with a retainer spring having a thickness of 1.25 inches and a total overall length of the spring from the pivot to the air bag support approximately 30 inches.

The attachment of the shock absorber and the resulting angle of its axis with respect to the chassis is critical since, as located, the longitudinal motion of the shock absorber during complete flexure of the spring assembly, permits maximum to minimum position of the axle with only a small motion of the shock absorber. Since this motion is short, the forces applied by the shock absorber must be greater than standard, therefore, the shock absorber diameter will be larger than standard. The result, however, is less motion of the shock absorber and less wear which greatly increases life. This arrangement becomes particularly important during the unloaded operation where the shock absorber is subjected to a great deal of activity.

The angle of the axis of the shock absorber need not change due to changes in the axle seat since the distance from the point of fastening the shock absorber to the spring may remain constant with different axle seat heights. The angle of the shock absorber, when the alternative spring form shown in FIG. 5 is used, does change, but still is sufficiently flat as to minimize the shock absorber motion.

I claim:

1. A suspension for a wheeled vehicle having a chassis and a rigid axle comprising;
   a main spring having a forward end and a rear end, pivoted at its forward end by a bushing and supported at its rear end by an air bag mounted on said chassis,
   a bracket mounted on said chassis,
   said bushing comprising an inner sleeve bonded to a resilient rubbery material which in turn is surrounded by and substantially compressed by an outer sleeve,
   means to fixedly mount said inner sleeve in said bracket,
   means to force fit said forward end of said main spring on said outer sleeve whereby pivotal motion of said main spring is provided only by the torsional distortion of said rubbery material and
   interchangeable seat means to mount said axle a selectable distance above said main spring near the midpoint between said ends of said main spring.

2. A suspension as claimed in claim 1 including a retainer spring lying below and parallel to said main spring,
   said retainer spring having a forward end and a rear end, said forward end of said retainer spring being mounted on said bushing,
   said rear end of said retainer spring extending to a point only slightly beyond the location of said axle on said main spring and fastened to said main spring at that location.

3. A suspension as claimed in claim 1 including a shock absorber having two ends, a first end connected to said bracket and a second end connected to said seat means a fixed distance above said main spring whereby the axis of said shock absorber is at an angle substantially less than 90° with respect to said chassis.

4. A suspension for a wheeled vehicle having a chassis and a rigid axle comprising;
   a main spring having a forward end and a rear end,
   an air bag mounted on said chassis supporting said rear end of said main spring,
   a bracket mounted on said chassis,
   a bushing comprising an inner sleeve, an elastomeric material surrounding and bonded to said inner sleeve,
   an outer sleeve surrounding and substantially compressing said elastomeric material,
   means to fixedly mount said inner sleeve in said bracket,
   a substantially closed loop at the forward end of said main spring tightly enclosing said outer sleeve of said bushing and fixedly attaching said main spring to said outer sleeve whereby pivotal motion of said main spring about its forward end is permitted only by distortion of said elastomeric material,
   interchangeable seat means to mount said axle a selectable distance above said main spring substantially midway between said ends of said main spring and means to clamp said axle and said seat on to said main spring.

5. A suspension as claimed in claim 4 including a retainer spring lying parallel to and below said main spring having a forward end and a rear end,
   said forward end being wrapped around said loop on said main spring, said retainer spring being clamped to said axle and said main spring by the same means which clamps said axle and seat onto said main spring and said rear end of said retainer spring extending only slightly beyond the location of said axle.

6. A suspension as claimed in claim 5 including a shock absorber mounted at one of its ends on said seat a fixed distance above said spring and at the other of its ends on said bracket, whereby the axis of said shock absorber is at an angle of substantially less than 90° with respect to said chassis irrespective of the height of said axle above said main spring.

7. A suspension as claimed in claim 1 wherein the said resilient rubbery material comprises a polyurethane having a tensile strength of about 5000 psi and an elongation of about 490%.

8. A suspension as claimed in claim 4 wherein said elastomeric material comprises a polyurethane having a tensile strength of about 5000 psi and an elongation of about 490%.

* * * * *